United States Patent [19]

Tisue

[11] 4,226,541
[45] Oct. 7, 1980

[54] METHOD AND APPARATUS FOR SUPPRESSING THE EFFECTS OF SURFACE LIGHT SCATTER IN OPTICAL REFLECTIVE SCANNING SYSTEM

[76] Inventor: James G. Tisue, 7 Morning Sun Ct., Mountain View, Calif. 94043

[21] Appl. No.: 933,064

[22] Filed: Aug. 11, 1978

[51] Int. Cl.² ............................ G01N 21/22; G06K 7/14
[52] U.S. Cl. ........................................ 356/446; 250/566
[58] Field of Search ............... 356/430, 431, 445, 446, 356/448; 250/566

[56] References Cited

U.S. PATENT DOCUMENTS

| | | | |
|---|---|---|---|
| 3,883,436 | 5/1975 | Fletcher | 250/566 |
| 3,890,499 | 6/1975 | Lippel | 250/201 |
| 3,977,792 | 8/1976 | Jumonji et al. | 356/445 |
| 4,152,586 | 5/1979 | Elliott et al. | 250/201 |

Primary Examiner—John K. Corbin
Assistant Examiner—R. A. Rosenberger
Attorney, Agent, or Firm—Claude A. S. Hamrick

[57] ABSTRACT

A method and apparatus for suppressing the effects of surface light scatter in an optical reflective scanning system, wherein the method includes the steps of directly illuminating a small area upon the surface to be scanned, detecting the intensity of the light reflected by that area to produce a first signal proportional thereto, detecting the intensity of the light reflected from a scatter illuminated second area at least partially surrounding the directly illuminated area to produce a second signal proportional thereto, subtracting at least a portion of the second signal from the first signal to develop a compensated signal which represents the reflectivity of the directly illuminated first area as compensated for the light scattered back to the first area from the second area, and either using the compensated signal directly as analog data or converting it to a digital output signal which has a first state when the compensated signal is above a predetermined threshold and which has a second state when the compensated signal is below the predetermined threshold. The apparatus includes a light source and focusing optics for directly illuminating a small area of a surface to be scanned, detector optics for collecting light reflected from the directly illuminating area and directing it upon a first detector, and for collecting light reflected from a scatter illuminated second area at least partially surrounding the first area and directing it upon a second detector, and processing electronics responsive to signals generated by the first and second detectors and operative to produce an analog or digital output signal as described above.

16 Claims, 4 Drawing Figures

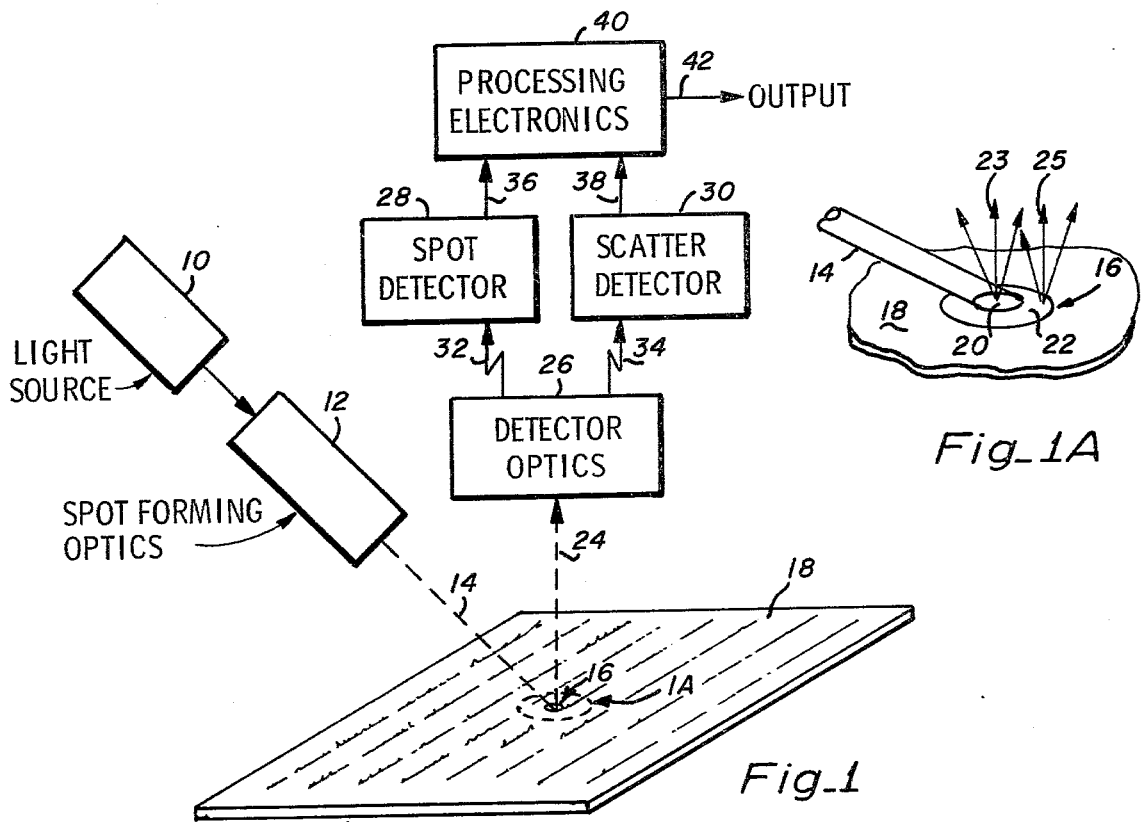
Fig_1A
Fig_1
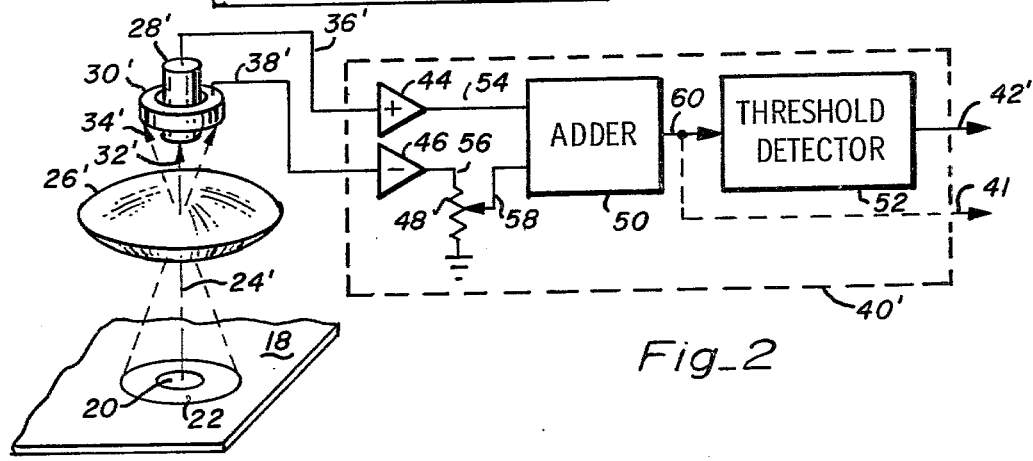
Fig_2
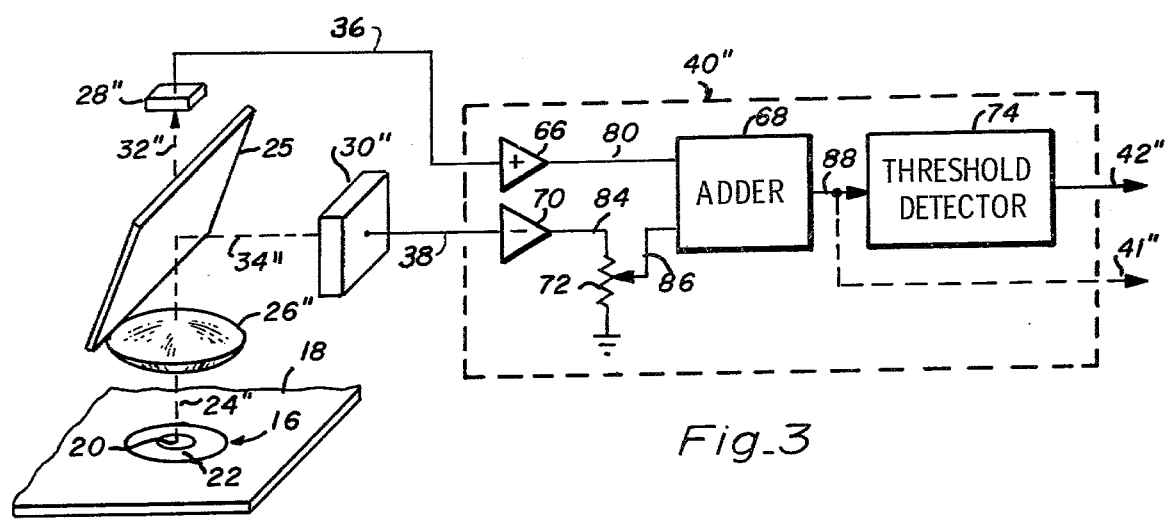
Fig_3

METHOD AND APPARATUS FOR SUPPRESSING THE EFFECTS OF SURFACE LIGHT SCATTER IN OPTICAL REFLECTIVE SCANNING SYSTEM

BACKGROUND OF THE INVENTION

1. Field of the Invention

This invention relates generally to optical reflective scanning systems and more particularly to methods and apparatus for suppressing the deleterious effects of surface light scatter in an optical reflective scanning system.

2. Description of the Prior Art

Optical reflective scanning systems are used in many types of devices, such as photo copiers and computer input periferals, to scan the surface of a document or other item and to produce a digital (black or white) representation therefrom.

There are three major types of reflective scanning systems now in use. In a first type of system, a light source flood illuminates the surface and a detector then sequentially scans the entire surface to detect the amount of light reflected from small areas along the scan path. The light reflected from these small areas is then used to generate digital signals which indicate whether the respective areas are predominantly black or white. From these digital signals an image of the scanned surface can be reproduced or stored.

A second type of system includes a scanning light source which sequentially illuminates small areas of the surface to be scanned and a wide angle detector and associated electronics which detect light reflected from the entire surface and develops digital signals that indicate whether small areas along the scanned path are predominantly black or white.

The third type of system is basically a combination of the first and second system types in that it includes a scanning means for spot illuminating small areas along the scanned surface and a scanning spot detector which follows the scanning beam and detects light reflected from the illuminated surface. The third type of system has the best resolution but is more complex and thus generally more expensive than the other two systems. Furthermore, the resolution of the optical scanning device increases with a decrease in the area that is "spot" illuminated by the light source until the area becomes so small that the so-called "scatter effect" comes into effect. Scatter effect refers to conditions wherein light is "scattered" from a directly illuminated area to a surrounding area and is then rescattered back into the directly illuminated area so as to have the effect of increasing the intensity of the light reflected from the directly illuminated area.

A problem encountered in the use of reflective scanners found in the prior art is that the quantity of light reflected from the illuminated area is partially dependent upon the amount of scattered light returned from the surrounding areas. For example, a white spot on a surface surrounded by a dark area reflects less light than a white spot surrounded by a white area. As a result a grey spot might be detected as black when surrounded by a dark area and as white when surrounded by a light area.

SUMMARY OF THE INVENTION

It is therefore an object of this invention to provide a method and apparatus for suppressing or otherwise compensating for the effects of surface light scatter in an optical reflective scanning system.

Briefly, the method of this invention includes illuminating a small area of a surface to be reflectively scanned, detecting the intensity of the light reflected from the small area and generating a first signal proportional thereto, detecting the intensity of the light reflected from an area at least partially surrounding the small area and generating a a second signal proportional thereto, subtracting at least a fraction of the second signal from the first signal to produce a compensated signal which represents the reflectivity of the small area as compensated for the effects of scattered light, and either using the compensated signal directly as analog data or converting it to a digital output signal having a first state when the compensated signal is above a predetermined threshold and having a second state when the compensated signal is below that threshold.

The apparatus includes a means for illuminating a small area of the surface to be reflectivety scanned, means responsive to the intensity of the light reflected from the small area and operative to produce a first signal, means responsive to the light reflected from an area at least partially surrounding the small area and operative to produce a second signal, means for subtracting at least a portion of the second signal from the first signal to produce a compensated intensity signal, and means responsive to the compensated signal and operative to produce a digital output signal which has a first state when the compensated signal is above a predetermined threshold level and which has a second state when the compensated signal is below the threshold level.

An important advantage of the present invention is that it provides for greater scanning resolution by suppressing the effects of surface light scatter.

Other objects and advantages of the present invention will no doubt become apparent to those skilled in the art upon a reading of the following detailed description of the preferred embodiment as accompanied by the several figures of the drawing.

IN THE DRAWING

FIG. 1 is a block diagram schematically illustrating an apparatus in accordance with the present invention for suppressing the effects of surface light scatter in an optical reflective scanning system.

FIG. 1A is an enlargement of the portion of FIG. 1 encircled by broken line 1A;

FIG. 2 is a diagram further illustrating certain features of a preferred embodiment of the apparatus shown in FIG. 1; and FIG. 3 is a diagram illustrating features of an alternative embodiment of the apparatus shown in FIG. 1.

DETAILED DESCRIPTION OF THE PREFERRED EMBODIMENT

As illustrated in FIG. 1 of the drawing there is shown an optical scanning system including a light source 10 and and associated optics 12 for illuminating an area 16 of a surface 18 to be scanned, and a light detection apparatus in accordance with the present invention which has the ability to receive light reflected from the illuminated spot and to suppress the effects of surface light scatter and develop an output signal indicative of the actual reflective characteristics of the directly illuminated spot uninfluenced by light scattered back from adjacent surface areas.

Referring briefly to FIG. 1A, which is a detail of the portion of surface 18 encircled by line 1A in FIG. 1, it may be seen that the area 16 illuminated by light beam 14 is actually composed of a directly illuminated first area 20 and an indirectly or "scatter" illuminated second area 22. Areas 20 and 22 reflect light as indicated at 23 and 25 which may be collected and focused to form a corresponding image in an image plane.

Referring again to FIG. 1, the combined reflected light 24 is gathered and split by detector optics 26 so that light reflected from the surface area 20 is cast upon a first or spot detector 28 and light reflected from the area 22 is cast upon a second or scatter detector 30, as illustrated by the arrows 32 and 34, respectively. Detector 28 develops a signal on a line 36 which is proportional to the intensity of light input thereto and, similarly, detector 30 develops a signal on a line 38 which is proportional to the intensity of the light that it receives.

Processing electronics 40 is responsive to the signals developed on lines 36 and 38 and is operative to, in effect, mathematically manipulate the signals to produce a compensated analog signal on line 41 or a digital output signal on line 42 which is proportional to the intensity of light attributable to direct reflection of the beam 14 independent of light scattered back into the area 20 from the adjacent area 22.

Referring now to FIG. 2, an implementation of the apparatus illustrated in FIG. 1 is shown to include an imaging lens 26', a photoelectric spot detector 28', a, photoelectric scatter detector 30', and processing electronics 40' which includes a non-inverting amplifier 44, an inverting amplifier 46, a potentiometer 48, an adder 50 and a threshold detector 52. For simplicity the illuminating optics are omitted.

In this embodiment, light reflected from spot 20 is gathered by lens 26' and formed into a convergent beam the center portion 32 of which is focused on spot detector 28'. Similarly, light reflected from area 22 gathered by lens 26' and formed into a convergent beam the outer portion 34' of which is focused on scatter detector 30'. In response to the light focused thereupon from the surface areas 20 and 22, the detectors 28' and 30' develop voltages proportional to the intensity of the reflected light and input these voltages via lines 36' and 38' into the amplifiers 44 and 46, respectively.

Amplifier 44 amplifies, without inversion, the output of detector 28' and inputs the amplified signal into one input terminal 54 of adder 40 while amplifier 46 both amplifies and inverts the output of detector 30' before coupling it into the input 58 of adder 50. Note that a potentiometer 48 is also included at the output of amplifier 46 so as to permit proportional adjustment of the amplitude of the inverted input to adder 50. This adjustment allows the operator to select a signal lever for input to adder 50 which is equivalent to the amount of light scatter reflected back into the area 20. Such adjustment would take into account the type of material being scanned, i.e., its surface configuration, reflectivity and scatter characteristics.

Adder 50 is a simple two input device capable of developing an analog output voltage on line 60 equivalent to the sum of the two voltages input thereto on lines 54 and 58. However, since one of the inputs to the adder has been inverted by amplifier 46, the signal developed on line 60 is actually proportional to the difference between the output of detector 28' and the adjusted output of detector 30' and is thus compensated so as to be proportional to the light reflected from the area 20 substantially independent of any back scattered illumination effects.

The compensated signal on line 60 can be used directly and output on line 41 or can be fed into a threshold detector 52 which in turn develops a digital output of a first state on line 42' if the compensated signal is above a preset threshold, and develops a digital output signal of a second state if the compensated signal is below that threshold. It will of course be appreciated that the output of detector 52 is not limited to two signal states and can, in fact, output signals of multiple signal states. For example it might develop signals of multiple states indicating black, white and various shades of grey data.

Referring now to FIG. 3, a second implementation of the apparatus generally illustrated in FIG. 1 is shown to include an imaging lens 26'', beam splitter 25 which divides the image beam 24'' into two beams 32'' and 34''. Beam 32'' produces an image of 20 and 22 in the plane of photocell 28'' while beam 34'' produces a similar image in the plane of photocell 30''. The size and location of 28'' is such that the image of 20 matches its effective surface area. The size and location of photocell 30'' is such that the combined image of 20 and 22 matches its effective surface area. Alternatively, two imaging lenses could be substituted for the single lens 26''. In such case one would be disposed between splitter 25 and detector 28'' and the other would be disposed between splitter 25 and detector 30''. As in FIG. 2 the illuminating optics are omitted.

As a result of the above described arrangement, a potential is developed on a line 36 which is representative of the total amount of light reflected from spot 20, and a potential is developed on a line 38 which is representative of the amount of light reflected from both the area of spot 20 and the surrounding scatter illuminated area 22.

The processing electronics 40'' is substantially identical to that of FIG. 2 and includes a non-inverting amplifier 66, an inverting amplifier 68, an adder 70, a calibrating potentiometer 72 and a threshold detector 74.

The input of non-inverting amplifier 66 is connected to input line 36'' and develops an amplified output potential signal on line 80. The input of inverting amplifier 70 is connected to input line 38'' and develops an amplified output potential signal on a line 84. The magnitude of the signal on line 84 may be adjusted however, by the potentiometer 72.

Adder 68 is connected to lines 80 and 86 and develops an output potential signal on a line 88 which is essentially the mathematical sum of the potentials input lines. Note that the central part of beam 34'' in effect cancels some of the output of detector 28'' and requires a slightly higher setting of potentiometer 72, i.e., as compared to the setting of potentiometer 48.

The remainder of the circuit operates in a similar fashion to the corresponding portion of the processing electronics of circuit 40' illustrated in FIG. 2.

Although this invention has been discussed in reference to particular preferred embodiments, it is contemplated that various alterations and modifications thereof will be obvious to those skilled in the art following a reading of the preceeding detailed description. It is therefore intended that the appended claims be interpreted as covering all such alterations and modifications as fall within the true spirit and scope of the invention.

What is claimed is:

1. A method of determining the data state of a selected area of a surface independent of the surface light back-scatter effect, comprising the steps of:
    illuminating a selected area of a solid surface with a focused beam which directly projects light only on said selected area;
    detecting the intensity of the light appearing to emanate from said selected area and generating a first electrical signal proportional thereto;
    detecting the intensity of any light appearing to emanate from an area of said surface adjacent said selected area and upon which said focused beam does not directly project light and generating a second electrical signal proportional thereto; and
    subtracting at least a portion of said second electrical signal from said first electrical signal to produce a compensated analog signal representing the actual reflectivity of said selected area.

2. A method as recited in claim 1 and further comprising the step of converting said compensated signal into a digital output signal having a first state when said compensated signal is above a predetermined threshold level and having a second state when said compensated signal is below said predetermined threshold level.

3. A method as recited in claim 2 wherein a predetermined number of said selected areas are sequentially illuminated and the quantities of light appearing to emanate from each such area and an adjacent area are detected, subtracted and converted to develop a series of digital output signals which is indicative of the data configurations of said surface.

4. An optical scanning system having means for suppressing the effects of surface light scatter comprising:
    illumination means for directly projecting a discrete spot of light onto a surface to be scanned, and including means for causing said spot of light to be swept across said surface;
    first means for detecting light appearing to emanate from the surface area directly illuminated by said spot of light at any point in time and for developing a first electrical signal proportional thereto;
    second means for detecting light appearing to emanate from an area immediately adjacent the surface area directly illuminated by said spot of light and for developing a second electrical signal proportional thereto; and
    means for subtracting at least a fraction of each said second signal from the corresponding first signal to produce a series of compensated analog signals which respectively represent the reflectivity of each said selected area.

5. An optical scanning system as recited in claim 4 and further comprising:
    means for converting said series of compensated signals into a series of digital output signals each of which has a first state when the corresponding selected area has a reflectivity above a particular threshold level, and a second state when the corresponding selected area has a reflectivity below said particular threshold level.

6. An optical scanning system as recited in claims 4 or 5 wherein said illumination means includes a light source and spot forming optics for focusing and directing light from said light source onto said surface.

7. An optical scanning system as recited in claim 6 wherein said light source includes a laser.

8. An optical scanning system as recited in claims 4 or 5 wherein said first means includes a photosensitive means which is responsive to the intensity of light impinging thereupon and is operative to produce an electrical signal proportional thereto.

9. An optical scanning system as recited in claim 8 wherein said first means further includes optical means for gathering and directing only that light reflected from the area of said surface directly illuminated by said spot of light onto said photosensitive means.

10. An optical scanning system as recited in claims 4 or 5 wherein said second means includes a photosensitive means which is responsive to the intensity of light impinging thereupon and is operative to produce an electrical signal proportional thereto.

11. An optical scanning system as recited in claim 10 wherein said second means further includes optical means for gathering and directing light reflected from said adjacent area onto said photosensitive means.

12. An optical scanning systems as recited in claim 4 and further comprising:
    means for converting said series of compensated signals into a series of digital output signals corresponding to the analog signal levels of said series of compensated signals, each said digital output signal being selected from a predetermined set of digital signals each having signal states corresponding to one of several predetermined signal states respectively identifying predetermined ranges of analog signal amplitude.

13. An apparatus for suppressing the effecting of surface light scatter in a reflective scanning system comprising:
    a light source;
    spot forming optics for directing light from said light source onto a first area on a surface to be reflectively scanned;
    a spot detector having a first photosensitive means responsive to the intensity of light impinging thereupon and operative to produce a first signal proportional thereto;
    a scatter area detector having a second photosensitive means responsive to the intensity of light impinging thereupon and operative to produce a second signal proportional thereto;
    detector optics means for gathering and directing only light reflected from said first area onto said first photosensitive means and for gathering and directing light reflected from a second area contiguous with and at least partially surrounding said first area onto said second photosensitive means; and
    processing electronic means responsive to said first and second signals and operative to produce a digital output signal having a first signal state when the reflectivity of said first area, as compensated for the light scatter detected in said second area, is greater than a given threshold and having a second state when the reflectivity of said first area, as compensated for the light scatter detected in said second area, is less than a given threshold.

14. An apparatus as recited in claim 13 wherein said detector optics means includes an imaging lens for processing light reflected from said first and second areas upon said first and second photosensitive means, respectively.

15. An apparatus as recited in claim 13 wherein said detector optics means includes a beam splitting means for directing the light reflected from said first area to said first photosensitive means and for directing the light reflecting from both said first and said second areas to said second photosensitive means.

16. An apparatus as recited in claim 13 wherein said processing electronics means includes:

a non-inverting amplifier means responsive to said first signal and operative to produce an amplified first signal;

an inverting amplifier means responsive to said second signal and operative to produce an amplified and inverted second signal;

means for adding at least a fraction of said amplified and inverted second signal to said amplified first signal to produce a compensated analog signal which represents the compensated reflectivity of said first area; and a threshold detector responsive to said compensated signal and operative to produce said digital output signal.

* * * * *